United States Patent [19]

Morinaga et al.

[11] Patent Number: 4,890,951
[45] Date of Patent: Jan. 2, 1990

[54] WEBBING SUPPORTING DEVICE

[75] Inventors: Masaru Morinaga, Yamato; Kazuhiko Sasaki, Kawasaki, both of Japan

[73] Assignee: Nippon Seiko Kabushiki Kaisha, Tokyo, Japan

[21] Appl. No.: 84,025

[22] Filed: Aug. 11, 1987

[30] Foreign Application Priority Data

Aug. 13, 1986 [JP] Japan .................................. 61-123410

[51] Int. Cl.4 .......................... F16B 2/00; A62B 35/00
[52] U.S. Cl. ..................................... 403/96; 403/24; 297/468; 280/808
[58] Field of Search ........................ 403/96, 97, 95, 93, 403/92, 329, 24, 84, 91, 113, 146; 297/468, 482, 483; 280/801, 808; 16/321, 334

[56] References Cited

U.S. PATENT DOCUMENTS

| 2,922,669 | 1/1960 | Hansen | 403/96 |
| 3,278,212 | 10/1966 | Kolb | 403/93 |
| 3,433,511 | 3/1969 | Frankel | 403/96 |
| 3,583,734 | 6/1971 | Magi | 403/96 |
| 3,649,828 | 3/1972 | Price | 403/96 X |
| 4,186,905 | 2/1980 | Brudy | 403/97 X |
| 4,339,844 | 7/1982 | Shatters | 403/96 X |
| 4,354,710 | 10/1982 | Rauschenberger | 403/95 X |
| 4,577,986 | 3/1986 | Wang | 403/95 X |
| 4,611,854 | 9/1986 | Pfeiffer | |
| 4,645,232 | 2/1987 | Hamada et al. | |

Primary Examiner—Randolph A. Reese
Assistant Examiner—Peter M. Cuomo
Attorney, Agent, or Firm—Wegner & Bretschneider

[57] ABSTRACT

A webbing of a vehicle seat belt system is supported by a webbing supporting device. The device is constructed of a bolt, a base plate, a slip joint, a resilient member, and cooperating holding arrangement. The plate is supported pivotally at one end thereof on the bolt. The joint supports the webbing thereon and is provided on the other end of the plate. The resilient member is fit loosely and rotatably on the bolt and has a portion to be connected to a vehicle body in order to prevent the resilient member from turning about the longitudinal axis of the bolt. The resilient member has a predetermined degree of resiliency in the direction of the longitudinal axis of the bolt. The cooperating holding arrangement is provided respectively on the plate and resilient member so as to hold the plate on the resilient member at least at a home position of the base plate.

12 Claims, 2 Drawing Sheets

4,890,951

WEBBING SUPPORTING DEVICE

BACKGROUND OF THE INVENTION (1) Field of the Invention

This invention relates to a webbing supporting device for supporting a webbing of a vehicle seat belt system.

(2) Description of the Prior Art

A variety of webbing supporting devices have heretofore been known to support a webbing of a vehicle seat belt system. A webbing supporting device is usually constructed of an anchor plate, i.e., base plate, a slip joint latched releasably with one end of the base plate, and a bolt fixed on a vehicle body and supporting pivotally the other end of the base plate. In addition, a holding member is arranged between the base plate and the vehicle body so that the holding member engages the base plate to hold the base plate at either use position or home position.

In order to ensure the holding of the base plate by the holding member, the base plate is usually biased in an engaging direction by a resilient member such as spring. Reference may be had to those described as prior art devices in U.S. Pat. No. 4,645,238 issued on Feb. 4, 1987 to Hideki Hamada, et al.

In addition to a member for holding the base plate at its use position or home position, the above-described conventional webbing supporting devices however require a resilient member for biasing the base plate toward its held position in order to ensure the holding of the base plate. The conventional webbing supporting devices are hence accompanied by a drawback that their entire mechanisms as webbing supporting devices are complex.

An object of this invention is therefore to solve the above-mentioned drawback and to provide a webbing supporting device which has a simple structure and permits holding of the base plate at the use position or home position without failure.

In one aspect of this invention, there is thus provided a webbing supporting device comprising:

a bolt;

a base plate supported pivotally at one end thereof on the bolt;

a slip joint supporting a webbing thereon and provided on the other end of the base plate;

a resilient member fit loosely and rotatably on the bolt and having a portion to be connected to a vehicle body in order to prevent the resilient member from turning about the longitudinal axis of the bolt, said resilient member having a predetermined degree of resiliency in the direction of the longitudinal axis of the bolt; and cooperating holding means provided respectively on the base plate and resilient member so as to hold the base plate on the resilient member at least at a home position of the base plate.

In another aspect of this invention, there is also provided a webbing supporting device comprising:

a bolt;

a base plate supported pivotally at one end thereof on the bolt so that the base plate is displaceable between at least two positions which are a use position and home position;

a slip joint supporting a webbing thereon and provided on the other end of the base plate;

a resilient member fit loosely and rotatably on the bolt and having a portion to be connected to a vehicle body in order to prevent the resilient member from turning about the longitudinal axis of the bolt, said resilient member having a predetermined degree of resiliency in the direction of the longitudinal axis of the bolt; and cooperating holding means provided respectively on the base plate and resilient member so as to hold the base plate on the resilient member at desired one of said at least two positions.

According to the present invention, the function to hold a base plate at a desired position and that to bias the base plate toward its held position are both performed by a single piece of member, namely, by a resilient member. The webbing supporting devices therefore has a simple structure. The base plate can therefore be held at the desired position, for example, at its use position or home position without failure.

BRIEF DESCRIPTION OF THE DRAWINGS

The above and other objects, features and advantages of the present invention will become apparent from the following description of the invention and the appended claims, taken in conjunction with the accompanying drawings, in which:

DETAILED DESCRIPTION OF THE INVENTION AND PREFERRED EMBODIMENT

Figure 1:
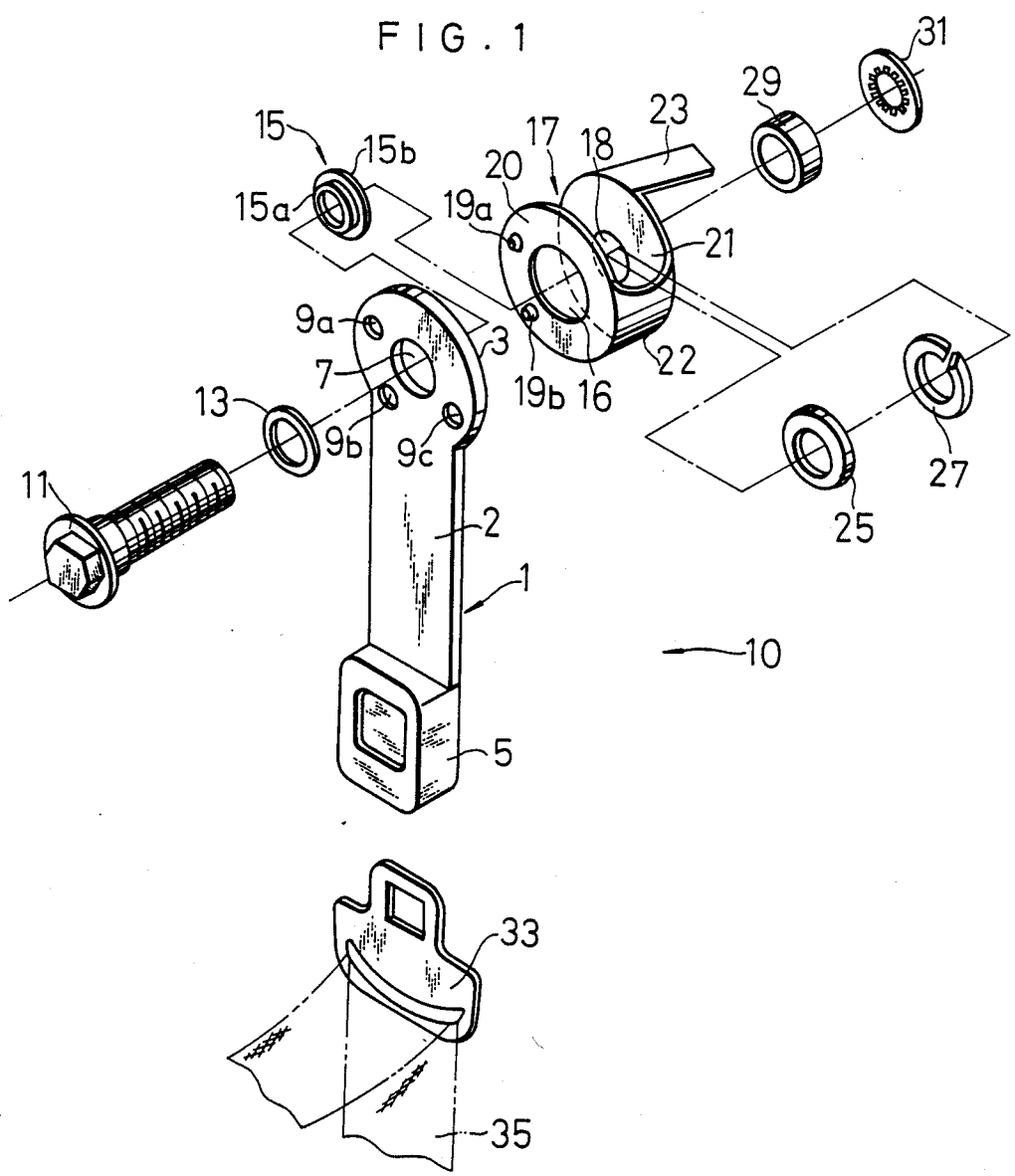
FIG. 1 is an exploded perspective view of a webbing supporting device according to one embodiment of this invention.

The one embodiment of this invention will hereinafter be described with reference to the accompanying drawings, in which like elements of structure are identified by like reference numerals.

Referring first to FIG. 1, the webbing supporting device according to the one embodiment of this invention is indicated generally at numeral 10. The webbing supporting device 1 is composed principally of a base plate 1, a bolt 11, a resilient member, i.e., a spring plate 17 and a slip joint 33. One end portion of the base plate 1 is formed into a latch portion 5, to which a slip joint 33 fastened to a webbing 35 is latched releasably. The other end portion is formed as a substantially circular portion 3 with a central through-hole 7 through which the bolt extends. The latch portion 5 and circular portion 3 are integral with a plate portion 2 which is rectangular as viewed in a front view. Around the through-hole 7 of the circular portion 3, three apertures 9a,9b,9c which extend through the circular portion 3 along the longitudinal axis of the bolt 11 are provided centrally the circular portion 3 with angular intervals of 90 degrees. Accordingly, a line segment connecting the apertures 9a and 9b and that extending between the apertures 9b and 9c cross substantially at a right angle.

The spring plate 17 is composed of substantially circular disks 20,21 and a bridge 22 connecting the circular disks 20,21 to each other. The spring plate 17 has a predetermined degree of resiliency in the direction of the longitudinal axis of the bolt 11. The disk 20 centrally defines a through-hole 16 through which the bolt 11 extends. The through-hole 16 has a diameter substantially larger than the diameter of the bolt 11, so that the disk 20 is allowed to flex freely in the direction of the longitudinal axis of the bolt 11 as will be described subsequently.

On the other hand, the disk 21 centrally defining a through-hole 18 the diameter of which is substantially the same diameter as the diameter of the bolt 11 is equipped with a lug 23 which extends from the periphery of the disk 21 in the direction of the longitudinal axis of the bolt 11. The lug 23 is fit in an unillustrated slot in a vehicle body 50 (see FIG. 3), whereby the disk 21 is fixed on the vehicle 50 and at the same time is prevented from turning about the longitudinal axis of the bolt 11. It will hence be understood that the disk 21 is substantially stationary in the direction of the longitudinal axis of the bolt 11 and the resilient force of the spring late 17 relies substantially on flexure of the disk 20.

Two projections of a substantially truncated conical shape, namely, beads are provided on a surface of the disk 20, which surface is facing the base plate 1. The beads, which are designated at numerals 19a and 19b respectively, are arranged antipodal to the bridge 22. The two beads 19a,19b are provided with an angular interval such that the angular interval between the beads 19a and 19b becomes substantially equal to the angular interval between the apertures 9a and 9b and also to the angular interval between the apertures 9b and 9c, which are formed through the circular portion 3 of the base plate 1. In the illustrated embodiment, the holding means are composed of the beads 19a,19b on the spring plate 17 and the apertures 9a,9b,9c through the base plate 1.

The procedure for mounting the webbing supporting device 10 on the vehicle body 50 is now described briefly in order to describe other members of the webbing supporting device 10. The bolt 11 with a first plastic bushing 13 supported rotatably thereon is inserted into the through-hole 7 of the base plate 1. A second plastic bushing 15 is interposed between the base plate 1 and spring plate 17. The plastic bushing 15 is composed of a small-diameter cylindrical portion 15a and a large-diameter disklike portion 15b. The cylindrical portion 15a is tight-fit within the through-hole 7 of the base plate 1, while the disklike portion 15b extends through the through-hole 16 of the spring plate 17 to a point between the disks 20 and 21.

Between the disks 20 and 21 of the spring plate 17, a collar 25 is interposed on the side of the disk 20 and a spring washer 27 is interposed on the side of the disk 21. Between the disk 21 and the vehicle body 50, a collar 29 and fiber washer 31 are interposed in order from the disk 21. The bolt 11 extends each of the above-described members to fix them in contiguous relations on the vehicle body 50.

Figure 3:
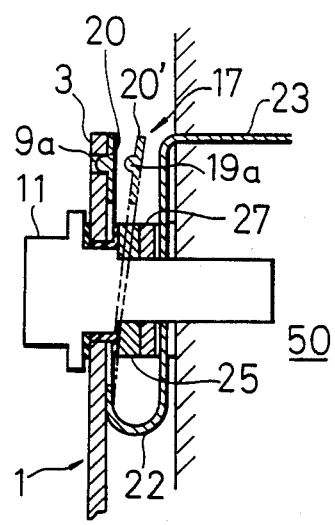
FIG. 3 is a cross-sectional view taken along line III—III of FIG. 2.

It is important here that although the outer diameters of the disklike portion 15b of the plastic bushing 15, collar 25 and spring washer 27 may be equal to one another, these diameters must be set significantly smaller than the diameter of the through-hole 16 of the disk 20. Incidentally, the webbing supporting device 10 supported on the vehicle body 50 is illustrated in FIG. 3. In a usual state of mounting, the beads 19a,19b on the disk 20 are fit respectively in the apertures 9a,9b in the base plate 1.

A specific operation of the webbing supporting device 10 will next be described with reference to FIG. 2 through FIG. 4.

Figure 2:
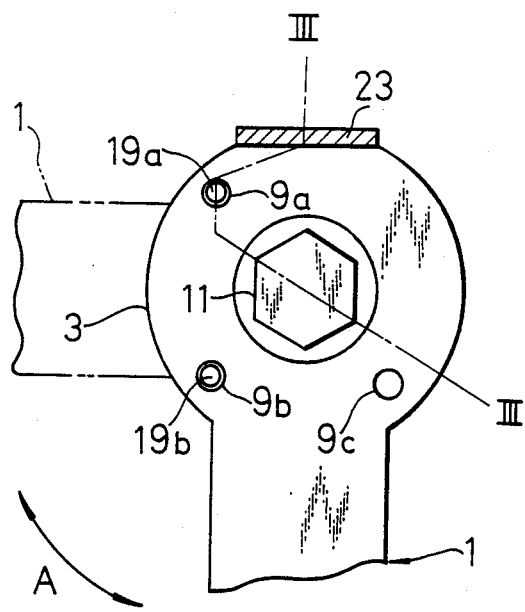
FIG. 2 is a front view of a webbing supporting device in its use position.

When the webbing supporting device 10 is at its use position as shown in FIG. 2, the beads 19a,19b on the spring plate 17 are fit respectively in the apertures 9a,9b in the base plate 1 so that the webbing supporting device 10 is held there. In order to move the webbing supporting device 10 from this state to the home position, it is necessary to turn the base plate 1 clockwise as viewed in FIG. 2. As the base plate 1 turns, forces are applied to the beads 19a,19b in such directions that the beads 19a,19b would be pushed out of their corresponding apertures 9a,9b. Since the spring plate 17 has the predetermined degree of resiliency in the direction of the longitudinal axis of the bolt 11 as has already been described above, the disk 20 of the spring plate 17 is reflexed as indicated by phantoms in FIG. 3 thereby to assume the position indicated by a numeral 20'. Here, the disk 20 is allowed to flex freely in the direction of the longitudinal axis of the bolt 11 because the through-hole 16 of the disk 20 is designed sufficiently larger than the outer diameter of each of the bolt 11, the disklike portion 15b of the plastic bushing 15, the collar 25 and the spring washer 27.

When the base plate 1 is turned further in the above-described state, the apertures 9b,9c come to positions opposite to the beads 19a,19b and the beads 19a,19b are hence brought into engagement with the apertures 9b,9c owing to the repulsive force of the spring plate 17. As a result, the webbing supporting device 10 is held at the home position. This home position is shown by phantoms in FIG. 2. Thus, the base plate 1 is pivotally displaceable between the use position and the home position in the direction indicated by an arrow A in FIG. 2.

Figure 4:
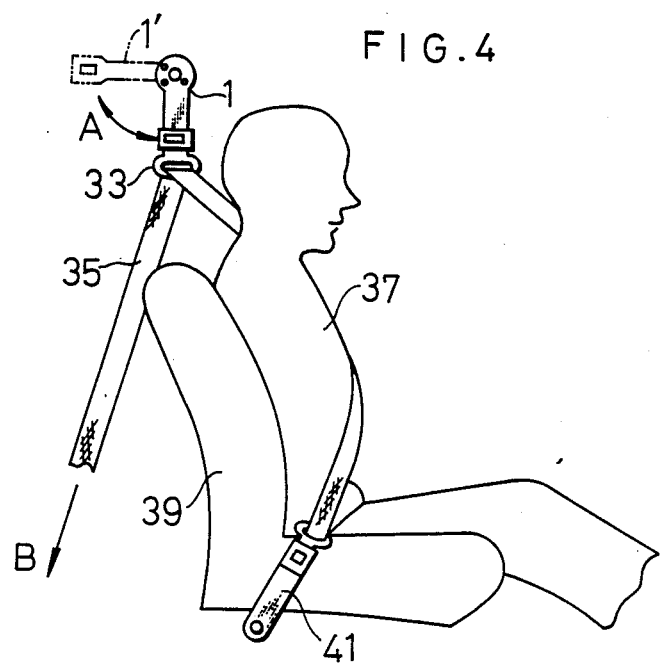
FIG. 4 illustrates a seat belt system in which the webbing supporting member of FIG. 1 has been incorporated.

Referring next to FIG. 4 from which the vehicle body 40 is omitted, an occupant 37 is on a seat 39. The webbing 35 is secured at one end thereof on the vehicle body (not shown) by way of an anchor 41, so that the webbing 35 is established in its restraining position across the upper torso of the occupant 37. The webbing 35 extends through the slip joint 33 and is connected at the other end thereof to an unillustrated retractor located in a direction indicate by an arrow B, whereby the webbing 35 is taken up by the retractor. The webbing supporting device 10 is fixed on the vehicle body by the bolt 11. As has already been described above, the webbing supporting device 10 is allowed to assume either one of the use position and home position (indicated by numerals 1 and 1' respectively) by turning same in the direction A.

In the illustrated embodiment, the turning angle between the use position and the home position is set at about 90 degrees. This turning angle may however be set at a desired angle either smaller or greater than 90 degrees by suitably changing the positions of the beads 19a,19b and those of the apertures 9a,9b,9c. The holding of the base plate 1 can be ensured further as more beads and apertures are provided. If the number of the apertures is only increased, the base plate 1 can be held at one or more additional positions other than the use position and home position. As an alternative, the number of the beads may be reduced to one and two matching apertures may be provided. In view of the fact that the physical constitution varies a lot from one occupant to another, it may be preferable in some instances that the use position is not specified. The number of beads may therefore be rendered equal to that of apertures so that the base plate is held only at the home position.

As is apparent from FIG. 3, the beads 19a,19b of the spring plate 17 are fit sufficiently deep within the corresponding apertures 9a,9b in the base plate 1. The holding of the webbing supporting device 10 is therefore firm while the base plate 1 assumes the use position or home position. It is however not absolutely necessary that the apertures 9a,9b,9c are through-apertures. They may be recesses formed in the base plate 1 such that the recesses oppose to the beads 19a,19b. Needless to say, the resilient force of the spring plate 17 must be set at a level slightly stronger than that for the through-holes in order to ensure the holding of the webbing supporting device 10. As a still further alternative, beads may be provided on the base plate 1 and matching apertures or recesses may be formed in the spring plate 17.

Having now fully described the invention, it will be apparent to one of ordinary skill in the art that many changes and modifications can be made thereto without departing from the spirit or scope of the invention as set forth herein.

We claim:

1. A webbing supporting device comprising:
   a bolt, said bolt having a longitudinal axis which defines a direction;
   a base plate supported pivotally at one end thereof on the bolt so that the base plate is displaceable between at least two positions which are a first position and a second position;
   a slip joint supporting a webbing thereon and provided on the other end of the base plate;
   a resilient member which is composed of a first plate portion fit loosely on the bolt and arranged close to the base plate, a second plate portion provided at a predetermined distance from the first plate portion in the direction of the longitudinal axis of the bolt, and a connecting part which connects parts of an outer circumference of the first and second plate portions to each other, said second plate portion of said resilient member defining a connecting portion to be connected to a vehicle body in order to prevent the resilient member from turning about the longitudinal axis of the bolt; and
   cooperating holding means provided respectively on the base plate and the first plate portion of the resilient member so as to hold the base plate on the resilient member at a desired one of said at least two positions, said holding means on said first plate portion being oppositely disposed to the connecting part relative to the bolt.

2. The device as claimed in claim 1, wherein the first position is located with an angular interval of approximately 90 degrees about the bolt from the second position.

3. The device as claimed in claim 1, wherein the holding means comprises a plurality of members provided on the base plate and on the resilient member, and wherein the members provided on the base plate outnumber the members provided on the resilient member.

4. The device as claimed in claim 1, wherein the cooperating holding means comprise apertures formed through the base plate and projections formed on the resilient member for engagement with the apertures.

5. The device as claimed in claim 4, wherein the projections extend along the longitudinal axis of the bolt.

6. The device as claimed in claim 1, wherein the cooperating holding means comprises recesses formed in one side of the base plate, said one side facing the resilient member, and projections provided on the resilient member and being engageable with the recesses.

7. The device as claimed in claim 1, wherein the connecting portion is a lug extending from the second plate portion in a direction opposite to the first plate portion.

8. The device as claimed in claim 1, wherein the slip joint is provided detachably on the other end of the base plate.

9. A webbing supporting device comprising:
   a bolt, said bolt having a longitudinal axis which defines a direction;
   a base plate supported pivotally at one end thereof on the bolt;
   a slip joint supporting a webbing thereon and provided on the other end of the base plate;
   a resilient member which is composed of a first plate portion fit loosely on the bolt and arranged close to the base plate, a second plate portion provided at a predetermined distance from the first plate portion in the direction of the longitudinal axis of the bolt, and a connecting part which connects parts of an outer circumference of the first and second plate portions to each other, said second plate portion of said resilient member defining a connecting portion to be connected to a vehicle body in order to prevent the resilient member from turning about the longitudinal axis of the bolt; and
   cooperating holding means provided respectively on the base plate and the first plate portion of the resilient member so as to hold the base plate on the resilient member at least at a home position of the base plate, said holding means on said first plate portion being oppositely disposed to the connecting part relative to the bolt.

10. The device as claimed in claim 9, wherein the holding means comprises a plurality of members provided on the base plate and on the resilient member, and wherein the number of members provided on the base plate is equal to the number of members provided on the resilient member.

11. A webbing supporting device comprising:
    a bolt, said bolt having a longitudinal axis which defines a direction;
    a base plate supported pivotally at one end thereof on the bolt so that the base plate is displaceable between at least two positions which are a first position and a second position;
    a slip joint supporting a webbing thereon and provided on the other end of the base plate;
    a resilient member which is composed of a first plate portion fit loosely on the bolt and arranged close to the base plate, a second plate portion provided at a predetermined distance from the first plate portion in the direction of the longitudinal axis of the bolt, and a connecting part which connects parts of an outer circumference of the first and second plate portions to each other, said second plate portion of said resilient member defining a connecting portion to be connected to a vehicle body in order to prevent the resilient member from turning about the longitudinal axis of the bolt; and
    cooperating holding means provided respectively on the base plate and the first plate portion of the resilient member so as to hold the base plate on the resilient member at a desired one of said at least two positions, said holding means on said first plate portion being oppositely disposed to the connecting part relative to the bolt;
    wherein through-holes, through which the bolt extends, are formed through the first and second plate portions, respectively.

12. The device as claimed in claim 11, wherein the diameter of the through-hole formed through the first plate portion is greater than that of the through-hole formed through the second plate portion.

* * * * *